United States Patent [19]

Byrd et al.

[11] Patent Number: 4,754,648

[45] Date of Patent: Jul. 5, 1988

[54] SAFETY RELIEF FOR PISTON-TYPE GAUGE PROTECTOR

[75] Inventors: Audis C. Byrd, Duncan; Robert J. Morris, Lawton, both of Okla.

[73] Assignee: Halliburton Company, Duncan, Okla.

[21] Appl. No.: 946,212

[22] Filed: Dec. 23, 1986

[51] Int. Cl.⁴ .................................................. G01L 7/16
[52] U.S. Cl. ........................................... 73/744; 73/756
[58] Field of Search ............... 73/744, 745, 746, 756, 73/146.8, 706

[56] References Cited

U.S. PATENT DOCUMENTS

| | | | |
|---|---|---|---|
| 1,563,847 | 12/1925 | Hall | 73/146.8 |
| 1,799,832 | 4/1931 | Rinne et al. | 73/756 |
| 1,836,682 | 12/1931 | Ray | 73/756 |
| 1,867,779 | 7/1932 | Thompson | 73/756 |
| 2,064,268 | 12/1936 | Parker | 73/756 |
| 2,147,031 | 2/1939 | Hastings et al. | 73/756 |
| 2,618,978 | 11/1952 | Ragland | 73/756 |
| 4,192,192 | 3/1980 | Schnell | 73/715 |
| 4,193,295 | 3/1980 | Curran | 73/146.8 |
| 4,199,991 | 4/1980 | Kodama | 73/706 |
| 4,297,891 | 11/1981 | Falcon | 73/756 |
| 4,608,870 | 9/1986 | Huber et al. | 73/745 |
| 4,686,855 | 8/1987 | Smith | 73/146.8 |

FOREIGN PATENT DOCUMENTS 805945  2/1969  Canada .
1069336  1/1980  Canada .

Primary Examiner—Donald O. Woodiel
Attorney, Agent, or Firm—James R. Duzan

[57] ABSTRACT

A gauge protector comprising a body, connector, cap assembly, piston with inter-relief valve assembly, valve extension assembly, and tattletale tube assembly with plug and plug level indicator assembly.

19 Claims, 3 Drawing Sheets

SAFETY RELIEF FOR PISTON-TYPE GAUGE PROTECTOR

BACKGROUND OF THE INVENTION

This invention relates to a piston type gauge protector having a safety relief, and the like, for protecting pressure gauges or pressure transducers connected to flow lines.

In general, it is important to protect pressure gauges which are used for monitoring various conditions in high pressure environments, such as high pressure pipelines, gas well tubing, and fracturing and acidizing equipment used in well servicing operations, from the fluids in those environments so that the pressure gauges will remain functional.

By way of example, in pumping a fluid through a pipeline it is necessary to monitor the pressure within the pipeline by means of a pressure gauge. This monitoring is necessary, for example, because the pressure measurements obtained by the monitoring process can be used to determine the extent of erosion of the tubing within a pipeline, which tubing may be that which is used in a gas well. However, because of the delicate nature of pressure gauges used in the monitoring process, precautions need to be taken to protect the pressure gauges. For example, in the previously mentioned gas well tubing a gauge damaging force may result from the large pressure pulses which are generated by fracturing fluid pumps located upstream from the pipeline locations at which the pressure gauges are to be connected to monitor the pipeline pressure. Also it is necessary to protect the pressure gauges from the effects of the fluids in the pipelines themselves to prevent damage to the gauges.

Typical prior art gauge protectors are disclosed in U.S. Pat. Nos. 4,297,891; 4,199,991; 4,192,192; 2,147,031; 2,064,268; 2,618,978; 1,867,779; 1,836,682; and 1,799,832 and Canadian Pat. Nos. 805,945 and 1,069,336. In both such prior art gauge protectors, a resilient bag or diaphragm is used to separate the fluid in the pipeline from that in the gauge. Alternatively, a piston may be used in place of the resilient bag or diaphragm.

However, gauge protectors using resilient bags, diaphragms, or pistons to separate the fluids between the pipelines and gauges will ultimately bottom out in the gauge protector housing giving a false reading on the pressure gauge since the movable member in the gauge protector will no longer respond to increases in pipeline fluid pressure.

STATEMENT OF THE INVENTION

In contrast to the prior art gauge protectors, the present invention is directed to a piston type gauge protector having a safety relief to allow any pressure gauge connected thereto to continue to display the appropriate pressure in the pipeline to which it is connected and to indicate to an observer that the gauge protector is operating with the safety relief open to the pressure gauge.

The gauge protector of the present invention comprises a body, connector, cap assembly, piston with inter-relief valve assembly, valve extension assembly, tattletale tube assembly with plug and plug level indicator assembly.

BRIEF DESCRIPTION OF THE DRAWINGS

The features and advantages of the present invention will be readily apparent to those skilled in the art when the following description of the preferred embodiment of the present invention is read in conjunction with the accompanying drawings.

DETAILED DESCRIPTION OF THE INVENTION

Figure 1:
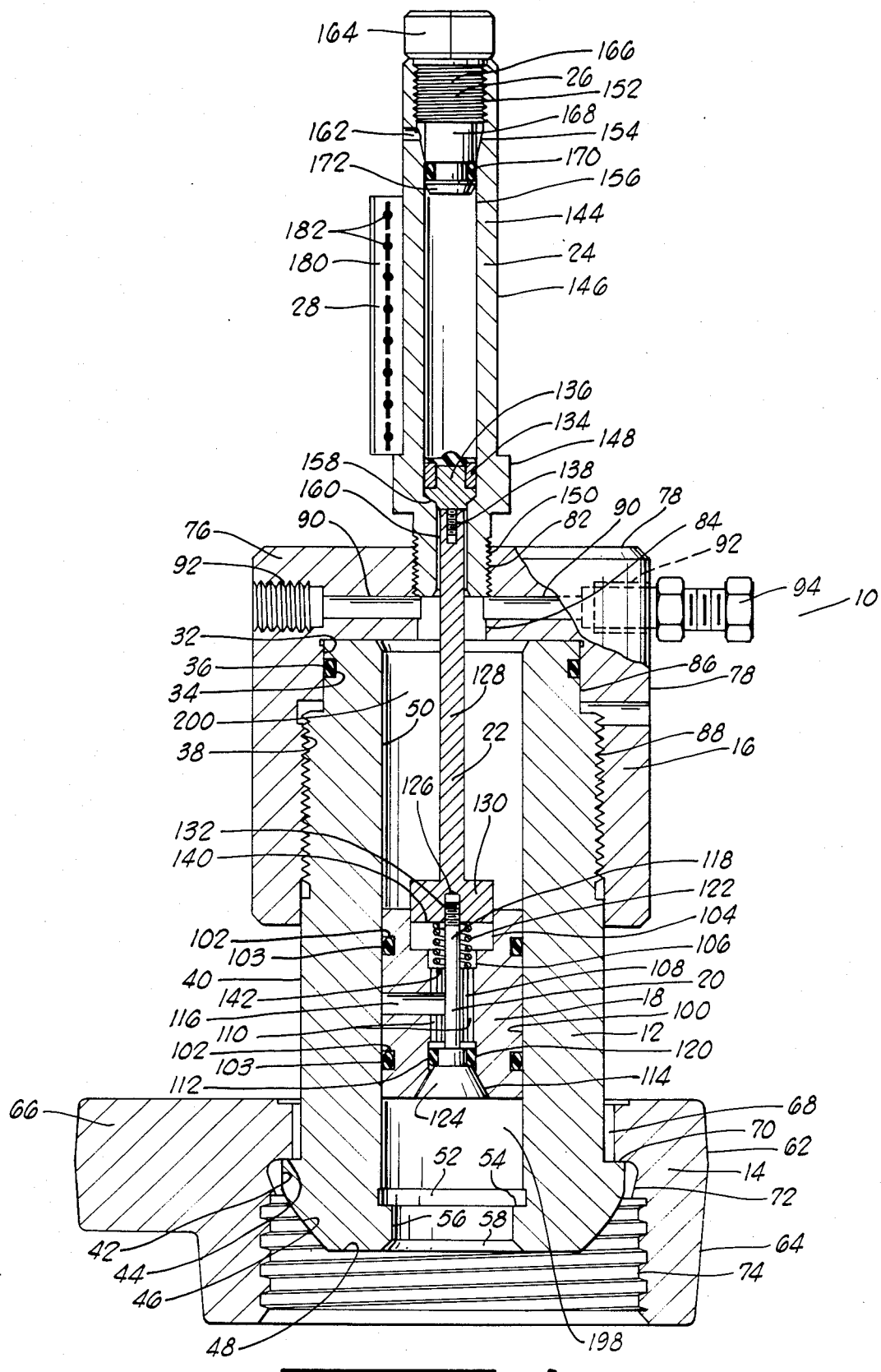
FIG. 1 is a cross-sectional view of the present invention in a first position with the safety relief closed.

Referring to FIG. 1, the gauge protector 10 of the present invention is shown in its preferred embodiment.

The gauge protector 10 comprises a body 12, connector 14, cap assembly 16, piston 18 with inter-relief valve assembly 20, valve extension assembly 22, and tattletale tube assembly 24 with plug 26 and plug level indicator assembly 28.

The body 12 comprises an elongated cylindrical member having, on the exterior thereof, a first cylindrical surface 32 having, in turn, annular recess 34 therein containing annular elastomeric seal 36 therein, threaded surface 38, second cylindrical surface 40, third cylindrical surface 42 having annular shoulder 44 located between the second cylindrical surface 40 and third cylindrical surface 44, annular frusto-conical surface 46, and annular end surface 48 and, on the interior thereof, first bore 50, annular recess 52, annular shoulder 54, second bore 56 and annular frusto-conical surface 58.

The connector 14 comprises an annular cylindrical member having, on the exterior thereof, first annular surface 62, second annular surface 64 and a plurality of hammer lugs 66 and, on the interior thereof, cylindrical bore 68, annular shoulder 70 which abuts annular shoulder 44 of body 12 when the connector 14 is installed thereon, relief surface 72 and threaded bore 74. The connector 14 is used to connect the gauge protector 10 of the present invention to any suitable mating connection on a flowline.

The cap 76 of cap assembly 16 comprises an annular cylindrical member having, on the exterior thereof, end surface 78 and cylindrical surface 80 and, on the interior thereof, first threaded bore 82, first cylindrical bore 84, second cylindrical bore 86 which is sealingly engaged by annular elastomeric seal 36 on body 12 when the cap 76 is installed on the body 12, and second threaded bore 88. The cap 76 further includes traverse passageway 90 having threaded portions 92 thereon which extends from cylindrical surface 80 to intersect first bore 84 to allow fluid communication therewith.

The cap assembly 16 further includes check valve assembly 94 connected to a threaded portion 92 of transverse passageway 90 to allow fluid to be pumped into the gauge protector 10 before the operation. The check valve assembly 16 can be any suitable commercially available type to allow fluid flow into the gauge protector 10 while preventing fluid flow therefrom.

The piston 18 comprises a cylindrical member having, on the exterior thereof, cylindrical surface 100 having, in turn, annular recesses 102 therein containing annular elastomeric seals 103 therein which slidingly, sealingly engage first cylindrical bore 50 of the body 12 when the piston is installed therein and, on the interior thereof, first cylindrical bore 104, second cylindrical bore 106, third cylindrical bore 108 surrounded by a plurality of longitudinal fluid flow passageways 110, fourth cylindrical bore 112 and annular frusto-conical bore 114. The piston 18 further includes at least one transverse fluid passageway 116 extending from cylindrical surface 100 located in the area of such surface between annular elastomeric seals 104 to third cylindrical bore 108. The plurality of longitudinal fluid flow passageways 110 allow fluid flow between second cylindrical bore 106 and fourth cylindrical bore 112 of the piston 18.

The inter-relief valve assembly 20 comprises a valve member 118, elastomeric seal 120, and spring 122.

The valve member 118 comprises an elongated valve stem having a frusto-conical head 124 on one end thereof, the frusto-conical head sealingly engaging the annular frusto-conical bore 114 of piston 18 when the valve member 118 is installed in the piston 18, and, on the other end, a threaded portion 126. The elongated valve stem of the valve member 118 extends through third cylindrical bore 108 of the piston 18 with the elastomeric seal 120 sealingly engaging fourth cylindrical bore 120 of piston 18 with the frusto-conical head 124 resiliently engaging the piston 18 through spring 122 applying a resilient closing force to the valve stem of the valve member 118.

The valve extension assembly 22 comprises a valve extension stem 128 having a cylindrical head 130 slidably received within first cylindrical bore 104 of piston 18 having sufficient clearance therearound for fluid flow around head 130 into upper portion 200 of body 12 located above piston 18, head 130 having, in turn, threaded bore 132 therein which threadably engages threaded portion 126 of valve member 118 and, on the other end thereof, a cylindrical magnetic member 134 releasably secured to the valve extension stem 128 by means of a portion of threaded fastener 136 engaging threaded bore 138 in the stem 128. The bottom end surface 140 of the valve extension stem 128 has one end of spring 122 in abutting relationship when the valve extension stem 128 is secured to the valve member 118 while the other end of spring 122 abuts the annular shoulder 142 between second cylindrical bore 106 and third cylindrical bore 108 of piston 18 thereby resiliently biasing the inter-relief valve assembly 22 in a closed position with respect to the piston 18.

The tattletale tube assembly 24 with plug 26 and plug level indicator assembly 28 comprises an elongated cylindrical member 144 having, on the exterior thereof, first cylindrical surface 146, second cylindrical surface 148 having, in turn, wrenching flats thereon, and threaded surface 150 which releasably, threadedly engages threaded bore 82 in cap 76 of cap assembly 16 and, on the interior thereof, threaded bore 152, first annular frusto-conical surface 154, first cylindrical bore 156 which slidingly receives magnetic member 134 therein, second annular frusto-conical surface 158 and second cylindrical bore 160. The elongated cylindrical member 144 further includes at least one fluid passageway 162 extending from the exterior first cylindrical surface 146 to the first annular frusto-conical bore 154.

The plug 26 comprises an elongated cylindrical member having a head 164, threaded body portion 166 which releasably, threadedly engages threaded bore 152 of elongated cylindrical member 144 and end portion 168 having, in turn, annular elastomeric seal 170 which sealingly engages first cylindrical bore 156 of elongated cylindrical member 144 when the plug 26 is installed therein releasably secured to the end portion by member 172.

The plug level indicator assembly 28 comprises indicator support strip 180 having a plurality of magnetic indicators 182 thereon.

The indicator support strip 180 may be of any suitable construction and may be attached to the elongated cylindrical member 144 of tattletale tube assembly 24 by any suitable means.

The magnetic indicators 182 each comprise a plastic member having a north/south pole magnet imbeded therein. In this manner, the magnetic indicators 182 have their longitudinal axis in alignment, as shown, when the valve extension assembly 22 is in its lower most position in the tattletale tube assembly 24. Alternately, when the cylindrical magnetic member 134 which is releasably secured to the end valve extension stem 128 moves adjacent a magnetic indicator 182, the indicator 182 turns to have its longitudinal axis point to the magnetic member 134 on the end of valve extension stem 128.

Figure 2:
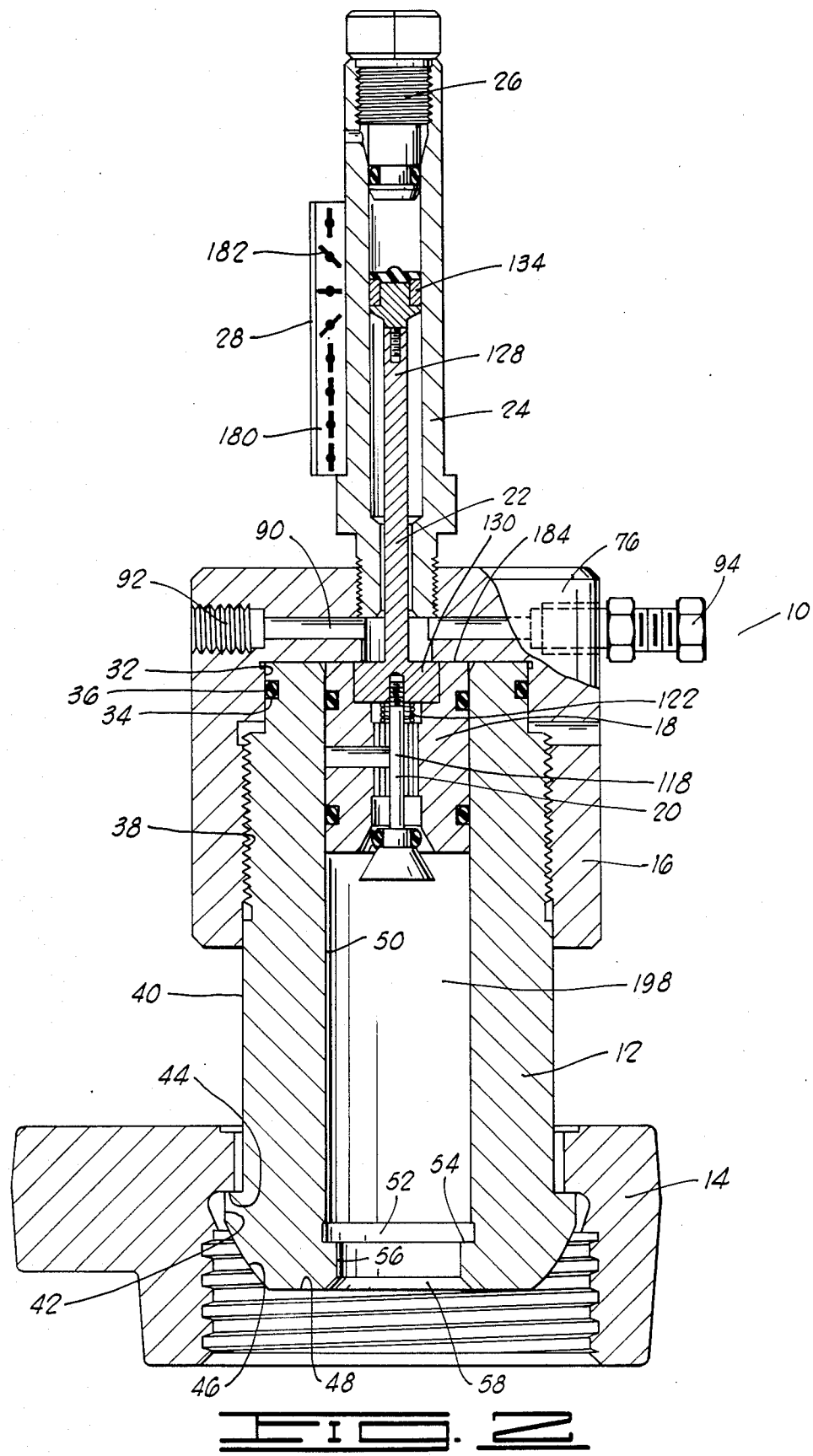
FIG. 2 is a cross-sectional view of the present invention in a second position with the safety relief open.

Referring to FIG. 2, the gauge protector 10 of the present invention is shown with the piston 18 with inter-relief valve assembly 20 in the upper most bottomed-out position in body 12 with the piston 18 abutting surface 184 of cap assembly 16. When the piston 18 is abutting surface 184 of cap 76, the magnetic member 134 of valve extension stem 128 has one or more of the magnetic indicators 182 indicating its bottomed-out position within tattletale tube assembly 24.

Additionally, when in this bottomed-out position within tattletale tube assembly 24, the valve member 118 of inter-relief valve assembly 20 is in its open position with respect to the piston 18 thereby allowing fluid from the interior of the body 12 in portion 198 below piston 18 to bypass through the piston 18 into passageway 90 to allow the gauge connected to threaded portion 92 to continue to accurately reflect the fluid pressure below piston 18.

OPERATION OF THE INVENTION

Figure 3:
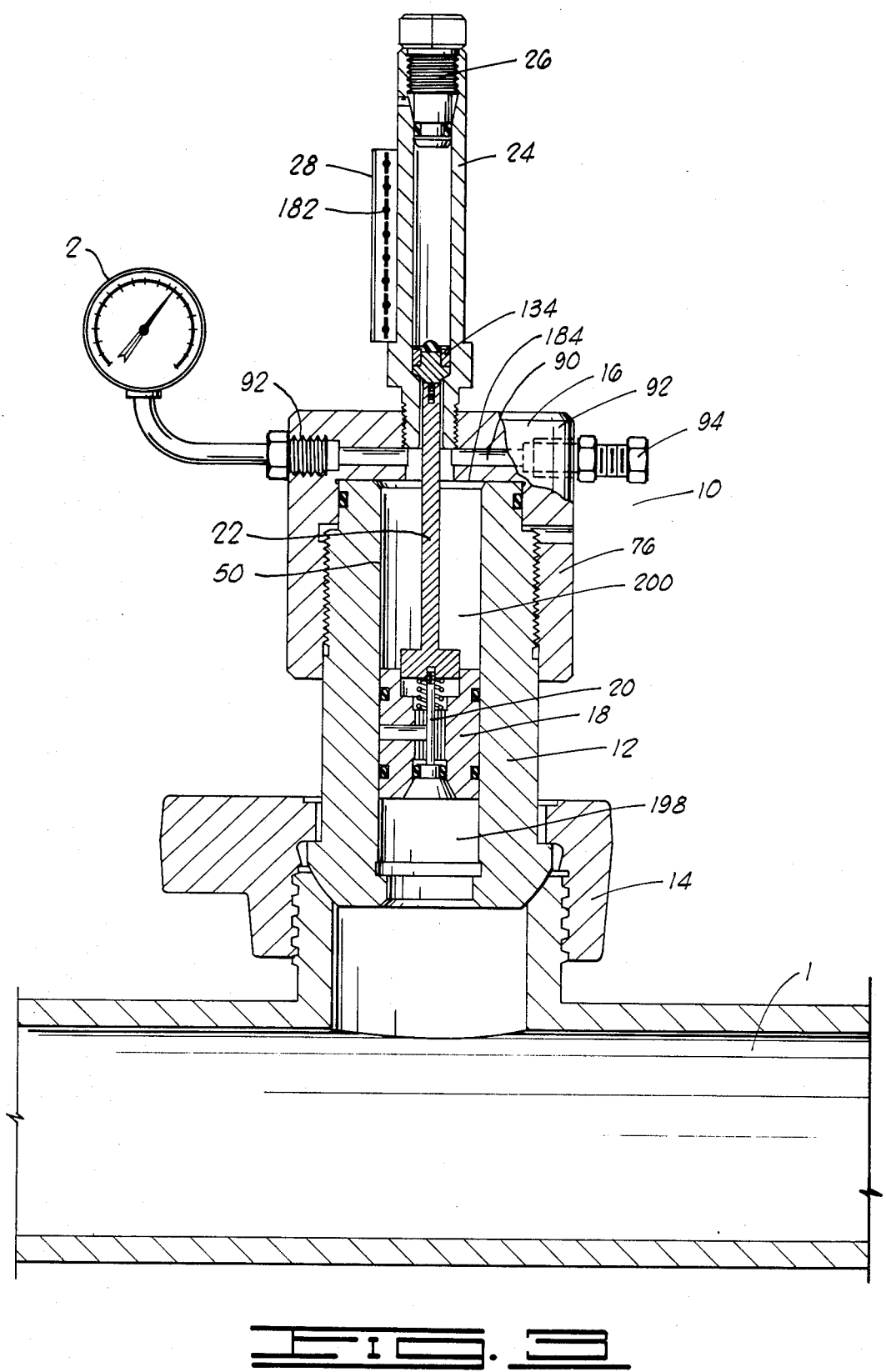
FIG. 3 is a cross-sectional view of the present invention installed on a flow line and having a gauge connected thereto.

Referring to FIG. 3, the gauge protector 10 of the present invention is shown connected to a flow line 1 and gauge 2.

The gauge protector 10 is connected to the flow line 1 by the connector 14 releasably threadedly engaging a portion of the flow line.

The gauge 2 is releasably, threadedly connected to one threaded portion 92 of passageway 90 in cap 76 while check valve 94 is connected to the other threaded portion 92 of passageway 90.

When the gauge protector 10 has been connected to the flow line 1 and gauge 2, a line is connected to the check valve 94 and oil or other suitable fluid is pumped into the passageway 90 and into the portion 200 of body 12 above the piston 18 thereby causing the piston 18 to be pumped down in the body 12 until the magnetic member 134 abuts second frusto-conical surface 158 of elongated cylindrical member 144 of tattletale tube assembly 24, as the valve extension stem 128 is connected to the magnetic member 134 and piston 18. When the portion 200 above piston 18 of body 12, passageway 90 and the gauge 2 connected to passageway 90 have been filled with oil or fluid and the piston 18 is in its lower most position in body 12, any fluid pressure change in the flowline 1 will be transferred via the piston 18 and oil or fluid thereabove to the gauge 2.

Assuming no loss of oil above the piston 18 occurs, the piston 18 will move within the first bore 50 of body 12 to transfer the fluid pressure in flowline 1 to gaug 2. If a loss of the oil or fluid above the piston 18 occurs, the piston 18 will move upwardly in the bore 50 of body 12 until the piston 18 abuts surface 184 cap 76.

Referring to FIGS. 2 and 3, when the piston 18 abuts surface 184 of cap 76, the head 130 of valve extension stem 128 abuts surface 184 thereby causing the spring 122 of the inter-relief valve assembly 20 to be compressed between the head 130 of valve extension stem 128 and annular shoulder 142 of piston 18.

When the head 130 of valve extension stem 128 abuts the surface 184 of cap 76, with the continued upper movement of piston 18 in first bore 50 of body 12 since the upward movement of head 130 is prevented and since the valve member 118 is connected to the head 130 of valve extension stem 130, the valve member 118 opens allowing fluid flow from portion 198 below piston 18 through piston 18, around head 130 and into passageway 90 to the gauge 2 to allow the gauge to continue to reflect the fluid pressure level in the flow line 1.

Still referring to FIGS. 2 and 3, since the magnetic member 134 is connected to one end of valve extension stem 128, as the stem 128 moves upwardly in the tattletale tube assembly 24 the magnetic indicators 182 of plug level indicator assembly 28 rotate on the support strip 180 to point in the direction of the magnetic member 134 to indicate its relative position within the elongated cylindrical valve 144 of tattletale tube assembly 24. In this manner, it may be observed when the piston 18 has bottomed-out in bore 50 of body 12 having the upper surface of the piston 18 abutting surface 184 of cap 76.

While the preferred embodiment of the gauge protector 10 of the present invention has been described for the purpose of this disclosure, numerous changes in the construction, arrangement of parts, and operating parameters, such as pressure levels, can be made by those skilled in the art, which changes are encompassed within the spirit of this invention as defined by the appended claims.

Thus, what is claimed is:

1. A gauge protector for protecting a gauge from the fluids flowing through a flow line, said gauge protector being connected to a portion of said flow line and having a gauge connected thereto, said gauge protector comprising:
    a body having a bore therethrough;
    a connector securing one end of the body to the portion of said flow line;
    a cap assembly secured to the other end of the body, the cap assembly including:
        an annular cylindrical member having a bore therethrough in communication with the bore in the body and a transverse passageway intersecting the bore in the annular cylindrical member and having said gauge connected to a portion thereof; and
        a check valve assembly connected to another portion of the transverse passageway in the annular cylindrical member to allow fluid to enter the transverse passageway in the annular cylindrical member but be prevented from flowing out the transverse passageway through the check valve assembly;
    a piston slidable with the bore in the body dividing the bore in the body into a portion on one side of the piston and another portion on the other side of the piston, the piston having a bore therethrough to permit fluid flow therethrough; and
    an inter-relief valve assembly slidably positioned within the bore of the piston thereof when in a first position in the bore in the piston, sealingly engaging a portion of the bore in the piston thereby preventing fluid flow from the portion of the body on one side of the piston to the another portion of the body on the other side of the piston and when in a second position in the bore in the piston, thereby allowing fluid flow from the portion of the body on one side of the piston to the another portion of the body on the other side of the piston.

2. The gauge protector of claim 1 wherein the inter-relief valve assembly includes:
    an elongated valve member slidable in the bore of the piston;
    an elastomeric seal retained on a portion of the elongated valve member sealingly engaging a portion of the elongated valve member and adapted to sealingly engage a portion of the bore in the piston; and
    a spring to bias the elastomeric seal retained on a portion of the elongated valve member into sealing engagement with a portion of the bore in the piston.

3. The gauge protector of claim 2 further comprising:
    a tattletale tube assembly secured to the cap and in communication with the bore in the cap.

4. The gauge protector of claim 3 wherein the tattletale tube assembly includes:
    an elongated cylindrical member having a bore therethrough and having one end thereof secured to the cap and in communication with the bore in the cap;
    a plug secured to the other end of the elongated cylindrical member; and
    a plug level indicator assembly secured to the elongated cylindrical member.

5. The gauge protector of claim 3 wherein the plug level indicator assembly includes:
    an indicator support strip secured to the elongated cylindrical member; and
    a plurality of magnetic indicators rotatably secured to the indicator support strip.

6. The gauge protector of claim 5 wherein the plurality of magnetic indicators comprises:
    a plurality of north/south pole magnets, each north/south pole magnet being embedded in plastic and being rotatably secured to the indicator strip of the plug level indicator assembly.

7. The gauge protector of claim 5 further comprising:
    a valve extension assembly connected to a portion of the inter-relief valve assembly and upon the movement thereof causing the actuation of the plug level indicator assembly to indicate the relative position of the piston in the body.

8. The gauge protector of claim 7 wherein the valve extension assembly comprises:
    a valve extension stem having one end thereof secured to one end of the elongated valve member of the inter-relief valve assembly, extending through the bore in the cap and into the bore in the elongated cylinder of the tattletale tube assembly;

a magnetic member located on the other end of the valve extension stem and slidable within the bore of the elongated cylindrical member of the tattletale tube assembly; and a fastener securing the magnetic member to the valve extension stem.

9. A gauge protector for protecting a gauge from the fluids flowing through a flow line, said gauge protector being connected to a portion of said flow line and having a gauge connected thereto, said gauge protector comprising:

a body having a bore therethrough;

a connector securing one end of the body to the portion of said flow line;

a cap assembly secured to the other end of the body, the cap assembly including:

an annular cylindrical member haivng a bore therethrough in communication with the bore in the body and a transverse passageway intersecting the bore in the annular cylindrical member and having said gauge connected to a portion thereof; and a check valve assembly connected to another portion of the tranverse pasageway in the annular cylindrical member to allow fluid to enter the transverse passasgeway in the annular cylindrical member but be prevented from flowing out the transverse passageway through the check valve assembly;

a piston slidably within the bore in the body dividing the bore in the body into a portion on one side of the piston and another portion on the other side of the piston, the piston having a bore therethrough to permit fluid flow therethrough; and an inter-relief valve assembly slidably positioned within the bore of the piston thereof when in a first position in the bore in the piston, sealingly engaging a portion of the bore in the piston thereby preventing fluid flow from the portion of the body on one side of the piston to the another portion of the body on the other side of the piston and when in a second position in the bore in the piston, thereby allowing fluid flow from the portion of the body on one side of the piston to the another portion of the body on the other side of the piston, the inter-relief valve assembly including:

an elongated valve member slidable in the bore of the piston;

an elastomeric seal retained on a portion of the elongated valve member sealingly engaging a portion of the elongated valve member and adapted to sealingly engage a portion of the bore in the piston; and a spring to bias the elastomeric seal retained on a portion of the elongated valve member into sealingly engagement with a portion of the bore in the piston.

10. The gauge protector of claim 9 further comprising:

a tattletale tube assembly secured to the cap and in communication with the bore in the cap.

11. The gauge protector of claim 10 wherein the tattletale tube assembly includes:

an elongated cylindrical member having a bore therethrough and having one end thereof secured to the cap and in communication with the bore in the cap;

a plug secured to the other end of the elongated cylindrical member; and a plug level indicator assembly secured to the elongated cylindrical member.

12. The gauge protector of claim 10 wherein the plug level indicator assembly includes:

an indicator support strip secured to the elongated cylindrical member; and a plurality of magnetic indicators rotatably secured to the indicator support strip.

13. The gauge protector of claim 10 wherein the plurality of magnetic indicators comprises:

a plurality of north/south pole magnets, each north-/south pole magnet being embedded in any suitable material and being rotatably secured to the indicator strip of the plug level indicator assembly.

14. The gauge protector of claim 13 further comprising:

a valve extension assembly connected to a portion of the inter-relief valve assembly and upon the movement thereof causing the actuation of the plug level indicator assembly to indicate the relative position of the piston in the body.

15. A gauge protector for protecting a gauge from the fluids flowing through a flow line, said gauge protector being connected to a portion of said flow line and having a gauge connected thereto, said gauge protector comprising:

a body having a bore therethrough;

a connector securing one end of the body to the portion of said flow line;

a cap assembly secured to the other end of the body, the cap assembly including:

an annular cylindrical member having a bore therethrough in communication with the bore in the body and a transverse passageway intersecting the bore in the annular cylindrical member and having said gauge connected to a portion thereof; and a check valve assembly connected to another portion of the transverse passageway in the annular cylindrical member to allow fluid to enter the transverse passageway in the annular cylindrical member but be prevented from flowing out the transverse passageway through the check valve assembly;

a piston slidable within the bore in the body dividing the bore in the body into a portion on one side of the piston and another portion on the other side of the piston, the piston having a bore therethrough to permit fluid flow therethrough; and an inter-relief valve assembly slidably positioned within the bore of the piston thereof when is a first position in the bore in the piston, sealingly engaging a portion of the bore in the piston thereby preventing fluid flow from the portion of the body on one side of the piston to the another portion of the body on the other side of the piston and when in a second position in the bore in the piston, thereby allowing fluid flow from the portion of the body on one side of the piston to the another portion of the body on the other side of the piston, the inter-relief valve assembly including:

an elongated valve member slidable in the bore of the piston;

an elastomeric seal retained on a portion of the elongated valve member sealingly engaging a portion of the elongated valve member and adapted to sealingly engage a portion of the bore in the piston; and a spring to bias the elastomeric seal retained on a portion of the elongated valve member into sealing engagement with a portion of the bore in the piston;

a tattletale tube assembly secured to the cap and in communication with the bore in the cap.

16. The gauge protector of claim 15 wherein the tattletale tube assembly includes:

an elongated cylindrical member having a bore therethrough and having one end thereof secured to the cap and in communication with the bore in the cap;

a plug secured to the other end of the elongated cylindrical member; and a plug level indicator assembly secured to the elongated cylindrical member.

17. The gauge protector of claim 16 wherein the plug level indicator assembly includes:

an indicator support strip secured to the elongated cylindrical member; and a plurality of magnetic indicators rotatably secured to the indicator support strip.

18. The gauge protector of claim 16 wherein the plurality of magnetic indicators comprises:

a plurality of north/south pole magnets, each north-/south pole magnet being embedded in any suitable material and being rotatably secured to the indicator strip of the plug level indicator assembly.

19. The gauge protector of claim 18 further comprising:

a valve extension assembly connected to a portion of the inter-relief valve assembly and upon the movement thereof causing the actuation of the plug level indicator assembly to indicate the relative position of the piston in the body.

* * * * *

UNITED STATES PATENT AND TRADEMARK OFFICE
CERTIFICATE OF CORRECTION

PATENT NO. : 4,754,648

DATED : July 5, 1988

INVENTOR(S) : Audis C. Byrd et al.

It is certified that error appears in the above-identified patent and that said Letters Patent is hereby corrected as shown below:

In Column 5, line 5, delete the word [gaug] and insert therefor --gauge--.

Signed and Sealed this

Seventeenth Day of January, 1989

Attest:

DONALD J. QUIGG

*Attesting Officer*  *Commissioner of Patents and Trademarks*